United States Patent [19]
Feitel

[11] Patent Number: 5,142,998
[45] Date of Patent: * Sep. 1, 1992

[54] APPARATUS AND METHOD FOR TREATING CONTAMINATED GAS EMISSIONS

[76] Inventor: Frederick E. Feitel, 10311 Mooreville Rd., Saline, Mich. 48176

[ * ] Notice: The portion of the term of this patent subsequent to Apr. 9, 2008 has been disclaimed.

[21] Appl. No.: 629,375

[22] Filed: Dec. 18, 1990

Related U.S. Application Data

[62] Division of Ser. No. 442,133, Nov. 28, 1989, Pat. No. 5,005,495.

[51] Int. Cl.$^5$ .............................................. F23J 15/00
[52] U.S. Cl. .................................. 110/215; 110/204; 110/344; 110/346
[58] Field of Search ............... 110/344, 345, 204, 210, 110/215

[56] References Cited

U.S. PATENT DOCUMENTS

| | | | |
|---|---|---|---|
| 3,861,334 | 1/1975 | Stockman | 110/204 |
| 4,355,601 | 10/1982 | Hattiangadi | 110/204 |
| 4,491,093 | 1/1985 | Hoekstra | 110/215 |
| 4,526,760 | 7/1985 | Empie, Jr. | 110/210 |
| 4,616,572 | 10/1986 | Berthiller | 110/204 |
| 4,656,972 | 4/1987 | Shimoda | 110/204 |
| 4,676,177 | 6/1987 | Engstrom | 110/210 |
| 4,726,302 | 2/1988 | Hein et al. | 110/215 |
| 4,738,206 | 4/1988 | Noland | 110/346 |
| 5,005,495 | 4/1991 | Feitel | 110/344 |

Primary Examiner—Henry C. Yuen
Attorney, Agent, or Firm—Brooks & Kushman

[57] ABSTRACT

Apparatus (10) and a method for removing volatile organic contaminants from particulate material utilizes a particulate material processor (12) and an emissions processor (14) which includes a recirculating emissions pretreatment circuit (16) and a final treatment system (18). The recirculating emissions pretreatment circuit (16) has an inlet (72) that receives the contaminated hot gas emissions from a heating unit (20) of the material processor (12) and also has a condenser (76) that is preferably embodied by a wet scrubber (88) for removing condensible gases from the emissions prior to passage through an outlet (78) thereof back to the heating unit (20). An inlet (82) of the final treatment system (18) has a fan (48) that draws off a portion of the pretreated emissions for a final treatment. This final treatment may be provided either by a flame burner that is most preferably a part of the heating unit of the particulate material processor (12) or by a carbon adsorber (144).

9 Claims, 2 Drawing Sheets

APPARATUS AND METHOD FOR TREATING CONTAMINATED GAS EMISSIONS

This is a divisional of Ser. No. 7/442,133 filed on Nov. 28, 1989 now U.S. Pat. No. 5,005,495.

TECHNICAL FIELD

This invention relates to an apparatus and method for removing volatile organic contaminants from particulate material such as soil, sludge or the like.

BACKGROUND ART

Prior art systems for removing volatile organic contaminants from particulate material such as soil, sludge or the like conventionally perform a heating step that removes the contaminants from the particulate material. This heating can be used to remove hydrocarbons such as gasoline, fuel oil or kerosine etc. Such heating removes the organic contaminants as gas emissions which must be treated in order to prevent contamination of the atmosphere. These gas emissions have conventionally been treated by combustion or incineration that oxidizes the organics as well as by wet scrubbing and the use of activated carbon. Such conventional treatment of the gas emissions must be performed on a relatively large volume flow which necessarily results in substantial costs.

One prior art system for removing volatile organic contaminants from particulate material is disclosed by U.S. Pat. No. 4,738,206 Noland. The system disclosed by the Noland patent incorporates mixing of a portion of the emissions with fresh air for flow through a combustion chamber to a oil heater that performs the heating of the particulate material. Such heating is performed on a heat exchange medium which is fed to a screw having hollow flights such that rotation of the screw moves the particulate material and also provides its heating. The combustion gases are fed over the particulate material as it is heated and conveyed in a counterflow manner.

DISCLOSURE OF INVENTION

An object of the present invention is to provide an improved apparatus and method for removing volatile organic contaminants from particulate material such as soil, sludge or the like. Substantial cost savings are achieved by the manner in which contaminated gas emissions are treated in accordance with the invention.

In carrying out the above object and other objects of the invention, the apparatus for removing volatile organic contaminants from particulate material such as soil, sludge or the like includes a particulate material processor having a heating unit including a housing in which the contaminated particulate material is heated to remove the organic contaminants therefrom as contaminated gas emissions. An emissions processor of the apparatus includes a recirculating emissions pretreatment circuit having an inlet that receives the emissions from the heating unit and a fan that draws the emissions into the pretreatment circuit through its inlet. The pretreatment circuit has a condenser for removing condensible gases from the emissions and also has an outlet through which the pretreated emissions are returned back to the heating unit. A final treatment system of the emissions processor has an inlet from the pretreatment circuit at a location between its condenser and outlet. The final treatment system includes a fan for drawing off through its inlet a portion of the pretreated emissions from the pretreatment circuit. An emissions treater treats the emissions as part of the final treatment system to reduce the concentration of the organic contaminants.

In the preferred construction of the apparatus, the fan of the emissions pretreatment circuit is located between the condenser and the outlet of the pretreatment circuit such that the gas emissions pass through the condenser initially and thereby prevent condensation of emissions at the fan. This condenser is preferably embodied as a wet scrubber, and the recirculating pretreatment circuit also preferably includes a solid separator through which the emissions pass to remove dust or particulates in the emissions prior to passage through the wet scrubber. A water recirculation circuit receives condensates from the wet scrubber and includes a water separator that separates water from the other condensates and solids and feeds the water back to the wet scrubber.

In the preferred construction disclosed, the final treatment system of the apparatus includes an adjuster that adjusts the portion of the pretreatment emissions drawn from the recirculating emissions pretreatment circuit for the final treatment of the organic contaminants. The emissions treater of the final treatment system downstream from the adjuster is disclosed as including an air cooler, a refrigerated condenser, and a final treater through which the pretreated emissions are processed. In one embodiment, a flame burner is provided and the final treatment system supplies pretreated emissions to the flame burner for combustion that oxidizes the organic contaminants. In another embodiment, the emissions treater of the final treatment system has a final treater embodied by a carbon filter including activated carbon that reacts with the emissions to adsorb the organic contaminants.

In the preferred construction of the apparatus, the heating unit of the particulate material processor includes a heat exchanger located within the housing, and the particulate processor also includes a heater for heating a heat exchange medium that is passed through the heat exchanger to heat the contaminated particulate material in order to provide the removal of the contaminants therefrom as contaminated gas emissions. This heater of the particulate material housing preferably includes a flame burner and the final treatment system in one preferred embodiment includes a conduit that delivers the emissions to the flamer burner of the heater for combustion of any combustible gases. Thus, while it is possible to utilize a separate burner for the combustion of the gases, it is preferable to utilize the same burner that heats the heating unit to provide combustion of the gas emissions. Best results are achieved when the heat exchanger is constructed as a rotatable screw received within a housing of the particulate material processor and having hollow flights through which the heat exchange medium passes to provide the heating. A rotary actuator such as an electric motor rotates the screw to move the contaminated particulate material through the housing as the heating takes place in order to heat the particulate material.

In carrying out the objects of the invention, a method for removing volatile organic contaminants from particulate material such as soil, sludge or the like is performed by heating the contaminated particulate material within an enclosed heater housing to remove the organic contaminants therefrom as contaminated gas emissions. These emissions are treated by recirculating the emissions from the heater housing through a condenser for a pretreatment to remove condensible gases and delivering the pretreated emissions back to the heater housing. A portion of the pretreated emissions are drawn off after passage through the condenser but before delivery back to the heater housing and are treated to reduce the concentration of organic contaminants preferably by either the flame burner combustion or carbon filter treatment previously described in connection with the apparatus.

The method is preferably performed by recirculating the emissions through a wet scrubber to remove the condensible gases with best results being achieved by first recirculating the emissions through a solids separator to remove particulates therefrom and then passing the emissions through the wet scrubber to remove the condensible gases. Less than 50% of the pretreated emissions that pass through the condenser are drawn off from the recirculating emissions for the organic contaminant treatment, and best results are achieved when less than 25% of the pretreated emissions that pass through the condenser are drawn from the recirculating emissions for the organic contaminant treatment.

The objects, features, and advantages of the present invention are readily apparent from the following detailed description of the best modes for carrying out the invention when taken in connection with the accompanying drawings.

BRIEF DESCRIPTION OF DRAWINGS

FIG. 1 is a view illustrating apparatus according to the present invention for removing volatile organic contaminants from particulate material such as soil, sludge or the like;

BEST MODES FOR CARRYING OUT THE INVENTION

Figure 1:
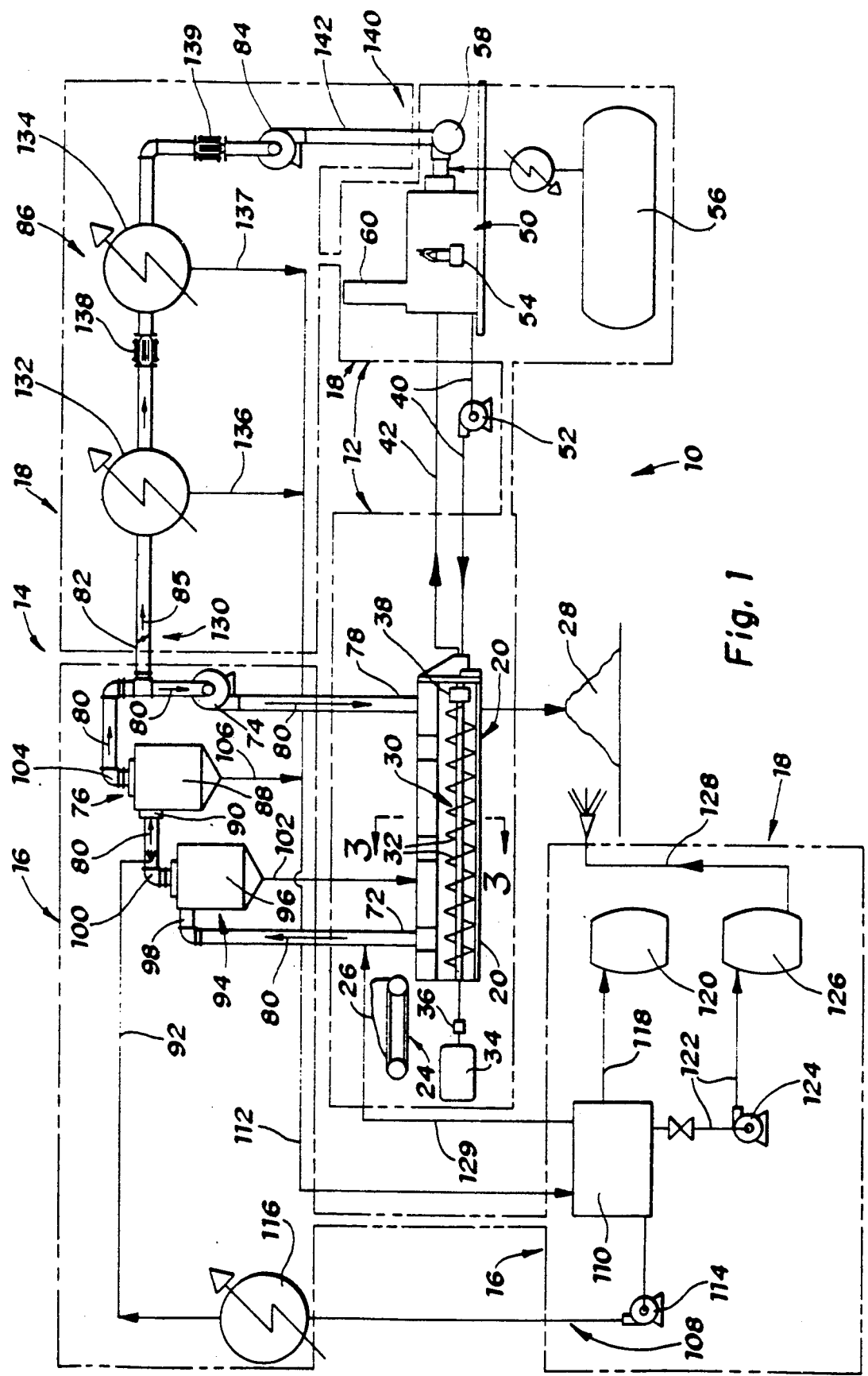

With reference to FIG. 1 of the drawings, apparatus generally indicated by 10 is constructed in accordance with the present invention and performs the method thereof to remove volatile organic contaminants from particulate material such as soil, sludge or the like. More specifically, this apparatus is effective to remove organic contaminants such as hydrocarbons like gasoline, fuel oil and kerosine etc. from soil or sludge in order to provide environmental cleanup. The apparatus 10 is illustrated as including a particulate material processor 12 and an emissions processor 14. As is hereinafter more fully described, the emissions processor 14 includes a recirculating emissions pretreatment circuit 16 and a final treatment system 18 whose cooperative operation provide efficient treatment of contaminated gas emissions received from the particulate processor 12.

With continuing reference to FIG. 1, the particulate material processor 12 includes a heating unit 20 having a housing 22 in which the contaminated particulate material is heated to remove the organic contaminants therefrom as contaminated gas emissions. A feed conveyor 24 supplies the contaminated particulate material 26 to the left inlet end of the material processor housing 20 for processing as the material is conveyed toward its right outlet end and ultimately delivered as uncontaminated material 28.

Figure 2:
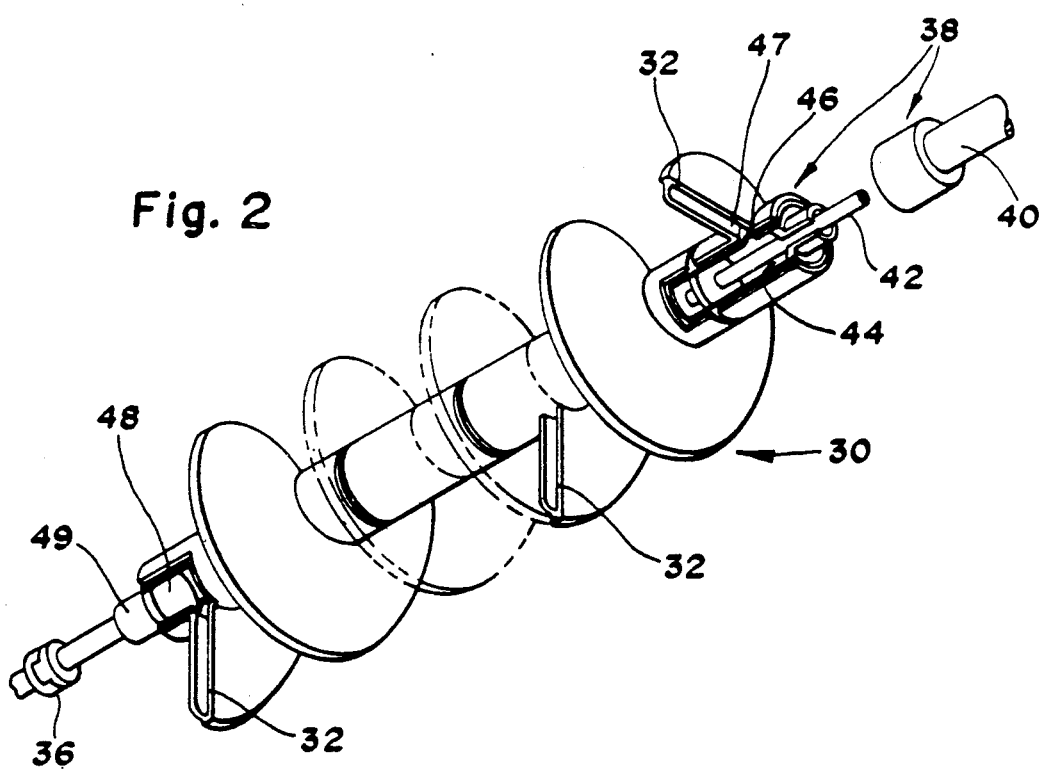
FIG. 2 is a partial perspective view of a heat exchanger embodied by a rotatable screw having hollow flights through which a heat exchange medium is passed to provide heating of the particulate material in accordance with the preferred practice of the invention.
Figure 3:
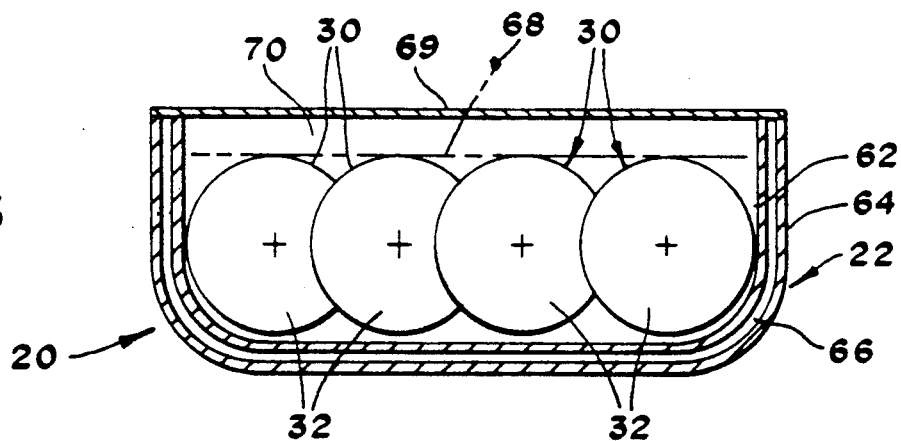
FIG. 3 is a sectional view taken through a particulate material processor of the invention generally along the direction of line 3—3 in FIG. 1.

With combined reference to FIGS. 1 through 3, the heating unit 20 of the particulate material processor is disclosed as including at least one rotatable screw 30 and preferably includes a plurality of such screws as illustrated by the four screws in FIG. 3. Each screw 30 has hollow flights 32 through which a heat exchange medium such as heat transfer oil is passed so that the screw functions as a heat exchanger to perform heating of the contaminated particulate material A rotary actuator 34 illustrated in FIG. 1 is preferably embodied by an electric motor and has a rotary output connected by a suitable drive coupling 36 to one end of each conveyor screw 30 to provide screw rotation that conveys the particulate material from the left toward the right during the heating and treatment of the material to remove volatile organic contaminants. The other end of each screw 30 is connected by a fluid coupling 38 shown in FIG. 2 to a supply conduit 40 and a return conduit 42 through which the heat exchange medium flows. The supply conduit 40 feeds the heat exchange medium through the coupling 38 and from a chamber 44 through a port 46 into the hollow flight as shown by arrow 47 for helical flow along the length of the screw to provide indirect heating in a heat exchange manner. After passage the entire length of the screw 30, the heat exchange medium reaches a reversing chamber 48 and then flows back through the return conduit 42 along the axis of screw rotation to the fluid coupling 38 that also provides rotatable support of the screw at the adjacent end. At the other screw end adjacent the reversing chamber 48, a bearing 49 rotatably supports the screw.

As shown in FIG. 1, the particulate material processor 12 includes a heater 50 that provides heating of the heat exchange medium which is moved by a pump 52 through the supply conduit 40 to the screw 30 as described above prior to being returned through the return conduit 42. At the heating unit 50, a flame burner 54 provides heating of the heat exchange medium to a relatively high temperature of about 450 to 650 degrees Fahrenheit through the combustion of fuel such as gas or fuel oil supplied from a source 56 along with air supplied by a combustion blower 58 as is hereinafter more fully described. The products of combustion are fed through a stack 60 to the atmosphere as is also is hereinafter more fully described.

As shown in FIG. 3, the housing 22 of the heating unit 20 has a jacketed construction including inner and outer housing members 62 and 64 defining an internal passage 66 through which the heat exchange medium is also passed in order to provide additional heating of the particulate material. Best results are achieved when the particulate material has a level as shown at 68 just covering the screws 30 whose flights 32 are overlapped in an intermeshing relationship so as to provide good mixing and heating of the particulate material during the conveyance through the heating unit housing. This housing 22 also has a cover 69 defining a generally enclosed chamber 70 above the material level 68. During the processing, a slight vacuum is drawn within the chamber 70 such that contaminated gas emissions from the particulate material do not tend to leak to the environment through the housing. Rather, the heating of the contaminated particulate material removes the organic contaminants therefrom as contaminated gas emissions which are slightly under vacuum with respect to ambient pressure such that no leakage takes place from the housing.

With reference again to FIG. 1, the recirculating emissions pretreatment circuit 16 of the emissions processor 14 has an inlet 72 that receives the contaminated hot gas emissions at about 212 degrees Fahrenheit from the heating unit 20 and also has a fan 74 that draws the emissions into the pretreatment circuit through its inlet 72. A condenser 76 of the pretreatment circuit removes condensible gases from the emissions during the pretreatment and normally cools the emissions to a temperature of about 170 degrees Fahrenheit. An outlet 78 of the pretreatment circuit 16 feeds the pretreated emissions back to the heating unit 20 in a recirculating manner with respect to the inlet 72 with the entire flow being along the direction shown by arrows 80 through the associated conduits.

As also shown in FIG. 1, the final treatment system 18 of the emissions processor 14 has an inlet 82 from the pretreatment circuit 16 at a location between the condenser 76 and the outlet 78 thereof. A fan 84 of the final treatment system 18 draws off a portion of the pretreated emissions flowing along the pretreatment circuit 16 for flow through the inlet 82 as shown by arrow 85 for processing. Final treatment system 18 includes an emissions treater collectively indicated by 86 for treating the drawn off emissions to reduce the concentration of the organic contaminants in a manner which is hereinafter more fully described.

By treating only a portion of the hot gas emissions at the final treatment system 18 while recirculating the rest of these emissions through the pretreatment circuit 16, the more expensive final treatment is substantially reduced to thereby provide more efficient apparatus for removing the volatile organic contaminants from the particulate material.

With continuing reference to FIG. 1, the fan 74 of the emissions pretreatment circuit 16 is preferably located between the condenser 76 and outlet 78 of the pretreatment circuit such that condensation within the fan during its operation is thereby reduced. This fan may be either a radial blade type fan or a squirrel cage blower type fan and as illustrated is located downstream along the pretreatment circuit 16 from the inlet 82 to the final treatment system 18 although it could also be located upstream from that inlet.

Condenser 76 of the recirculating pretreatment circuit 16 shown in FIG. 1 is preferably embodied as a wet scrubber 88 whose inlet 90 receives the hot gas emissions for processing as well as receiving water from a supply conduit 92. The recirculating pretreatment circuit 16 also preferably includes a solids separator 94 through which the hot gas emissions pass to remove dust or particulates prior to passage through the wet scrubber. This solids separator 94 is illustrated as a dry cyclone 96 whose inlet 98 receives the contaminated hot gas emissions from the pretreatment circuit inlet 72. A gas outlet 100 of the dry cyclone 96 feeds the gas emissions to the inlet 90 of the wet scrubber 88, while a solids outlet 102 of the dry cyclone 98 feeds the separated solids back to the particulate material processor heating unit 20. Wet scrubber 88 has a gas outlet 104 through which pretreated gas emissions flow to the fan 76 and to the final treatment system 18, while a liquid outlet 106 of the wet scrubber 88 delivers water and other liquid condensates from the gas emissions within the wet scrubber.

A water recirculation circuit 108 of the pretreatment circuit 16 receives the condensates from the wet scrubber 88 through its outlet 106 and a water return passage 112 that is also associated with the final treatment system 18. This water separator 110 separates water from the other condensates and solids and feeds the water back to the wet scrubber through the supply conduit 92 along which a water pump 114 and a water cooler 116 are disposed to provide pumping and cooling of the recirculated water. Separator 110 also feeds hydrocarbons through a conduit 118 to a recovery drum 120. Surplus water from the water separator 110 is drawn through a conduit 122 by a pump 124 and delivered to a reservoir 126 which preferably includes a carbon absorber. Clean water from the reservoir 126 may be supplied through a conduit 128 to dampen the cleaned particulate material 28 which normally becomes quite dusty as it is dried within the material processor heating unit 20. Also, a vent line 129 vents vapor from the water separator 110 to the pretreatment circuit 16 between its inlet 72 and the solids separator 94.

In its preferred construction, the final treatment system 18 illustrated in FIG. 1 includes an adjuster 130 that adjusts the portion of the pretreatment emissions drawn from the recirculating emissions pretreatment circuit 16 by the fan 84 for the final treatment of the organic contaminants. This adjuster 130 is disclosed as being embodied by a damper just downstream from the inlet 82 through which the emissions are drawn off from the pretreatment circuit 16 by the fan 84 for flow through the final treatment system 18. Fan 84 of the final treatment system may be embodied as a radial blade fan or a squirrel cage blower type fan. Between the inlet 82 and the fan 84, the final treatment system 18 includes an air cooler 132 that cools the emissions to about 70 to 90 degrees Fahrenheit and also includes a refrigerated condenser 134 that further cools the emissions to about 32 degrees Fahrenheit. Condensate outlets 136 and 137 from the air cooler 132 and the refrigerated condenser 134, respectively, are communicated with the water return passage 112 that empties into the water separator 110 as previously described. Thus, the water separator 110 and its associated components that separate water from the other liquid condensates are part of both the pretreatment circuit 16 and the final treatment system 18 of the emissions processor 14. Also, flame arresters 138 and 139 of the final treatment system 16 are respectively located between the air cooler 132 and refrigerated condenser 134 and between the refrigerated condenser 134 and fan 84 and prevent unintended combustion along the flow of the final treatment system.

In its preferred embodiment illustrated in FIG. 1, the final treatment system 18 also includes a final treater embodied by an outlet 140 that feeds the emissions through a conduit 142 to the combustion blower 58 for combustion by the flame burner 54 and resultant oxidization that reduces the level of organic contaminants. The resultant products of combustion of the emissions and fresh air supplied by the combustion blower 58 to the burner 54 then pass through the stack 60 to the environment with such combustion heating the heat exchange medium as previously described to provide the heating of the particulate material through the heat exchanger provided by the rotary screw 30. The heater 50 and its flame burner 54 thus functions with both the particulate material processor 12 and the final treatment system 18 of the emissions processor 14. Also, the combustion blower 58 may also function as the fan of the final treatment system 18 although greater flexibility is achieved with two fans, either of which may be of the radial fan blade type or squirrel cage blower type It should also be appreciate that the final treater 140 can also be embodied by a separate flame burner other than the one that functions as the burner for the heater 50 but that efficiency results by utilizing the same burner for both purposes.

Figure 4:
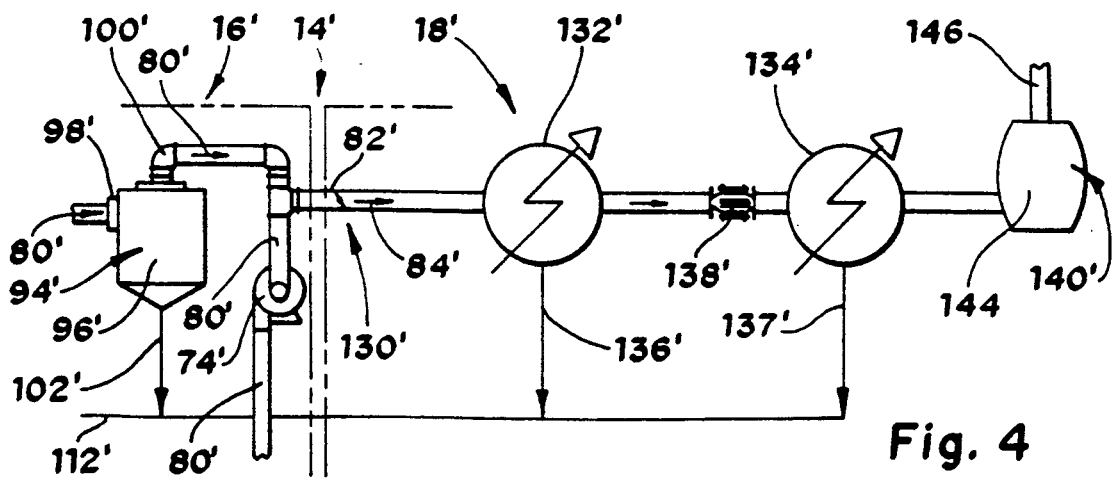
FIG. 4 is an alternate embodiment of a final treatment system of the apparatus.

With reference to FIG. 4, an alternate embodiment of the emissions processor 14' has the same construction as the previously described embodiment and is thus shown with corresponding primed reference numerals such that the prior description is applicable except as will be noted. In this alternate embodiment, the final treater 140' is embodied by a carbon adsorber 144 including activated carbon for adsorbing the organic contaminants prior to passage of the cleaned emissions through a vent stack 146 to the environment. While this carbon adsorber type of final treatment is more expensive than the burner type previously described, its usage may be desirable in some jurisdictions which prohibit incineration.

The final treater can also be embodied in other ways such as, for example, by a catalytic converter or any other device that will reduce the level of organic contaminants in the emissions.

While the best modes for carrying out the invention have been described in detail, those familiar with the art to which this invention relates will recognize various alternative designs and embodiments for practicing the invention as defined by the following claims.

What is claimed is:

1. Apparatus for treating contaminated gas emissions received from a particulate material processor including a heating unit having a housing in which contaminated particulate material, such as soil, sludge or the like having volatile organic contaminants, is heated to remove the organic contaminants therefrom as contaminated gas emissions, the apparatus comprising:
   an emissions processor including:
   (a) a recirculating emissions pretreatment circuit having an inlet that receives the emissions from the heating unit and a fan that draws the emissions into the pretreatment circuit through its inlet, the pretreatment circuit having a condenser for removing condensible gases from the emissions and also having an outlet through which the pretreated emissions are returned back to the heating unit, and the fan of the emissions pretreatment circuit being located between the condenser and the outlet of the pretreatment circuit; and
   (b) a final treatment system having an inlet from the pretreatment circuit at a location between the condenser and the outlet thereof, the final treatment system including a fan for drawing off through its inlet a portion of the pretreated emissions flowing along the pretreatment circuit, and an emissions treater for treating the emissions to reduce the concentration of the organic contaminants.

2. Apparatus for treating contaminated gas emissions as in claim 1 wherein the condenser of the emissions pretreatment circuit comprises a wet scrubber.

3. Apparatus for treating contaminated gas emissions as in claim 2 wherein the emissions pretreatment circuit also includes a solids separator through which the emissions pass to remove dust or particulates therein prior to passage through the wet scrubber.

4. Apparatus for treating contaminated gas emissions as in claim 2 wherein the emissions pretreatment circuit further includes a water recirculation circuit that receives condensates from the wet scrubber and has a water separator that separates water from the other condensates and solids and feeds the water back to the wet scrubber.

5. Apparatus for treating contaminated gas emissions as in any preceding claim wherein the final treatment system includes an adjuster that adjusts the portion of the pretreated emissions drawn from the recirculating emissions pretreatment circuit for the final treatment of the organic contaminants.

6. Apparatus for treating contaminated gas emissions as in claim 5 wherein the emissions treater of the final treatment system includes an air cooler, a refrigerated condenser, and a final treater through which the pretreated emissions are processed.

7. Apparatus for treating contaminated gas emissions as in claim 1 further including a flame burner, and the final treatment system supplying the pretreated emissions to the flame burner for combustion that oxidizes the organic contaminants.

8. Apparatus for treating contaminated gas emissions as in claim 1 wherein the emissions treater of the final treatment system has a final treater embodied by a carbon filter.

9. Apparatus for treating contaminated gas emissions received from a particulate material processor including a heating unit having a housing in which contaminated particulate material, such as soil, sludge or the like having volatile organic contaminants, is heated to remove the organic contaminants therefrom as contaminated gas emissions, the apparatus comprising:
   an emissions processor including:
   (a) a recirculating emissions pretreatment circuit having an inlet that receives the emissions from the heating unit and a fan that moves the emissions through the pretreatment circuit, the pretreatment circuit having a condenser located between the fan and the inlet thereof to remove condensible gases from the emissions, and the pretreatment circuit also having an outlet through which the pretreated emissions are returned back to the heating unit; and
   (b) a final treatment system including an inlet from the pretreatment circuit at a location between the condenser and the outlet thereof, a fan for drawing off a portion of the pretreated emissions from the pretreatment circuit into the final treatment system through the inlet thereof, an adjuster for controlling the portion of the pretreated emissions drawn from the pretreatment circuit, and an emissions treater for treating the emissions to reduce the concentration of the organic contaminants.

* * * * *